(12) United States Patent
Oi

(10) Patent No.: US 9,712,101 B2
(45) Date of Patent: Jul. 18, 2017

(54) MOTOR CONTROL SYSTEM

(71) Applicant: TOYOTA JIDOSHA KABUSHIKI KAISHA, Toyota-shi, Aichi-ken (JP)

(72) Inventor: Shohei Oi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/119,178

(22) PCT Filed: Jan. 23, 2015

(86) PCT No.: PCT/JP2015/052782
§ 371 (c)(1),
(2) Date: Aug. 16, 2016

(87) PCT Pub. No.: WO2015/125591
PCT Pub. Date: Aug. 27, 2015

(65) Prior Publication Data
US 2017/0012565 A1   Jan. 12, 2017

(30) Foreign Application Priority Data
Feb. 21, 2014 (JP) .................................. 2014-032290

(51) Int. Cl.
*H02P 27/00* (2006.01)
*H02P 1/00* (2006.01)
(Continued)

(52) U.S. Cl.
CPC ............ *H02P 27/085* (2013.01); *H02P 6/085* (2013.01); *H02P 2201/09* (2013.01)

(58) Field of Classification Search
CPC ................... H02M 3/158; H02M 1/34; H02M 2001/0035; H02M 2001/007;
(Continued)

(56) References Cited

U.S. PATENT DOCUMENTS 7,852,029 B2 * 12/2010 Kato ...................... B60L 11/14
318/400.01
7,911,162 B2 * 3/2011 Hanada ............... B60L 11/1807
318/139

(Continued)

FOREIGN PATENT DOCUMENTS

JP          2002-010668 A        1/2002

*Primary Examiner* — Paul Ip
(74) *Attorney, Agent, or Firm* — Andrews Kurth Kenyon LLP

(57) ABSTRACT

A motor control system include an inverter configured to convert boosted direct-current electric power output from a boost converter to alternating-current electric power and supply the alternating-current electric power to an alternating current motor, and a control unit configured to adjust boosted voltage of the boost converter. The control unit includes an optimal boosted voltage map which defines optimal boosted voltage for operating the alternating current motor with a required number of revolutions and required torque, and a boosted voltage changing program that sets boosted voltage of the boost converter to a voltage which is higher than an optimal boosted voltage when the carrier frequency is a predetermined threshold value or lower.

4 Claims, 4 Drawing Sheets

(51) Int. Cl.
*H02P 27/08* (2006.01)
*H02P 6/08* (2016.01)

(58) Field of Classification Search
CPC ........... H02M 2001/342; H02M 3/156; H02M
3/1588; H02M 7/53871; H02M 7/797;
H02P 23/009; H02P 21/00; H02P 21/02;
H02P 2201/03; H02P 2201/07
USPC .................... 318/400.3, 139, 400.01, 400.09
See application file for complete search history.

(56) References Cited

U.S. PATENT DOCUMENTS

| | | | | |
|---|---|---|---|---|
| 8,089,241 B2* | 1/2012 | Yamakawa | ........... | H02P 23/009 180/65.21 |
| 8,324,856 B2* | 12/2012 | Yamakawa | ........... | B60K 6/445 318/438 |
| 8,373,367 B2* | 2/2013 | Yoshida | ................ | B60K 6/445 318/139 |
| 8,494,698 B2* | 7/2013 | Murata | ................. | B60K 6/445 180/65.21 |
| 8,515,605 B2* | 8/2013 | Takaoka | ................ | B60K 6/365 180/65.1 |
| 8,907,647 B2* | 12/2014 | Nakagawa | ........ | H02M 7/53871 323/222 |
| 9,166,516 B2* | 10/2015 | Hayashi | .................. | H02P 21/02 |
| 9,421,975 B2* | 8/2016 | Sato | ....................... | B60W 10/26 |
| 2009/0058337 A1* | 3/2009 | Kato | ....................... | B60L 11/14 318/400.09 |
| 2009/0121669 A1* | 5/2009 | Hanada | ............... | B60L 11/1807 318/504 |
| 2009/0230901 A1* | 9/2009 | Amano | .................. | B60L 11/14 318/400.3 |
| 2009/0237019 A1* | 9/2009 | Yamakawa | ............. | H02P 23/04 318/400.09 |
| 2010/0026217 A1 | 2/2010 | Yoshida et al. | | |
| 2010/0138087 A1* | 6/2010 | Takaoka | ................. | B60K 6/365 701/22 |
| 2011/0006723 A1* | 1/2011 | Yamakawa | ............ | B60K 6/445 318/812 |
| 2012/0069613 A1* | 3/2012 | Nakagawa | ........ | H02M 7/53871 363/78 |
| 2013/0249451 A1* | 9/2013 | Kobayashi | ................ | H02P 5/74 318/400.3 |
| 2013/0300191 A1* | 11/2013 | Takaoka | ................. | B60K 6/365 307/9.1 |
| 2014/0139156 A1* | 5/2014 | Hayashi | .................. | H02P 21/02 318/400.3 |
| 2015/0232095 A1* | 8/2015 | Sato | ...................... | B60W 10/26 701/22 |
| 2016/0126907 A1* | 5/2016 | Moles | .................... | H03F 3/217 330/251 |

\* cited by examiner

US 9,712,101 B2

MOTOR CONTROL SYSTEM

CROSS-REFERENCE TO RELATED APPLICATIONS

This is a national phase application based on the PCT International Patent Application No. PCT/JP2015/052782 filed Jan. 23, 2015, claiming priority to Japanese Patent Application No. 2014-032290 filed Feb. 21, 2014, the entire contents of both of which are incorporated herein by reference.

TECHNICAL FIELD

The present invention relates to a motor control system designed to convert direct-current electric power, which is boosted, to alternating-current electric power for driving a motor.

BACKGROUND

Motor control systems designed to convert direct-current electric power supplied from a direct-current power source, such as a battery, to alternating-current electric power by an inverter for driving a motor, such as a three-phase synchronous electric machine, are in wide use. An inverter turns a plurality of switching elements on/off at a predetermined carrier frequency, thereby converting direct-current electric power to three-phase alternating-current electric power. When the carrier frequency is high and the on/off operations are performed with a high frequency, the waveform of the output three-phase alternating-current electric power is smooth, which makes control for the motor stabilized; however, the temperature of the switching elements increases due to a large amount of heat generated by the switching elements. On the other hand, when the carrier frequency is low and the on/off operations are performed with a low frequency, the waveform of the output three-phase alternating-current electric power includes fluctuation components, which deteriorate stability of motor control; however, the temperature rise in the switching elements is reduced, as the amount of heat generated by the switching elements is not so great. Therefore, in general, high carrier frequencies are used when the number of revolutions of a motor is high, whereas low carrier frequencies are used when the number of revolutions of a motor is low. Further, when the output torque of a motor is large, the amount of heat generated by the switching elements is large, as a great amount of electric current flows therein, whereas when the output torque of a motor is small, the amount of heat generated by the switching elements is also small, as a small amount of electric current flows therein. Accordingly, there is proposed a control method for controlling the carrier frequency to a low level when the motor has a low number of revolutions and a large torque, in order to suppress heat generation and temperature rise of the switching elements, and controlling the carrier frequency to a high level when the motor has a high number of revolutions, in order to ensure stability of control (see Patent Document 1, for example).

PRIOR ART DOCUMENTS

Patent Literature

Patent Document 1: JP 2002-010668 A

SUMMARY OF INVENTION

Technical Problem

However, the operation of an inverter at a low carrier frequency when the motor has a low number of revolutions and a large torque would result in driving the motor with a large alternating current containing fluctuation components, which increases fluctuation of the torque of the motor, causing significant variations in a counterelectromotive force from the motor. This may induce fluctuations of voltage of the inverter.

On the other hand, in order to operate the motor with the number of revolutions and torque in a wider range, recently, there has widely been used a method for boosting the voltage of the battery by a boost converter and converting the boosted direct-current electric power to alternating-current electric power by an inverter, thereby driving a motor.

If the inverter is operated at a low carrier frequency to drive the motor with a low number of revolutions and great torque in a motor control apparatus which performs such boosting, fluctuations in the counterelectromotive force of the motor increase, to thereby significantly fluctuate the boosted voltage, which may lead to degradation in the control performance of the boost converter.

The present invention is aimed at suppressing fluctuations of the boosted voltage in a motor control system, when an inverter is driven at a low carrier frequency for operating a motor with a low number of revolutions and large torque.

Solution to Problem

In accordance with an aspect of the invention, there is provided a motor control system including a boost converter configured to turn a plurality of first switching elements on/off at a predetermined carrier frequency to boost voltage of a battery and obtain boosted direct-current electric power, an inverter configured to turn a plurality of second switching elements on/off at a predetermined carrier frequency to convert the boosted direct-current electric power output from the boost converter to alternating-current electric power and supply the alternating-current electric power to a motor, and a control unit configured to adjust boosted voltage of the boost converter. The control unit includes an optimal boosted voltage map that defines optimal boosted voltage for operating the motor with a required number of revolutions and required torque, and boosted voltage changing means configured, when the carrier frequency is equal to or lower than a predetermined threshold value, to set the boosted voltage of the boost converter to a voltage which is higher than the optimal boosted voltage defined by the optimal boosted voltage map.

Preferably, in the motor control system according to the present invention, the boosted voltage changing means sets the boosted voltage of the boost converter to a system maximum voltage when the carrier frequency is equal to or lower than the predetermined threshold value.

Preferably, in the motor control system according to the present invention, the boosted voltage changing means sets the boosted voltage of the boost converter to a higher voltage as the torque of the motor is larger, when the carrier frequency is equal to or lower than the predetermined threshold value.

In accordance with another aspect of the invention, there is provided a motor control system including a boost converter configured to turn a plurality of first switching elements on/off at a predetermined carrier frequency to boost voltage of a battery and obtain boosted direct-current electric power, an inverter configured to turn a plurality of second switching elements on/off at a predetermined carrier frequency to convert the boosted direct-current electric power output from the boost converter to alternating-current electric power, the inverter supplying the alternating-current electric power to a motor, and a control unit including a CPU and configured to adjust boosted voltage of the boost converter. The control unit includes an optimal boosted voltage map that defines optimal boosted voltage for operating the motor with a required number of revolutions and required torque, and causes the CPU to execute a boosted voltage changing program for setting, when the carrier frequency is equal to or lower than a predetermined threshold value, the boosted voltage of the boost converter to a voltage which is higher than the optimal boosted voltage defined by the optimal boosted voltage map.

Advantageous Effects of Invention

The present invention can achieve an advantage that fluctuations of the boosted voltage can be suppressed in a motor control system, when the inverter is driven at a low carrier frequency to operate the motor with a low number of revolutions and large torque.

BRIEF DESCRIPTION OF DRAWINGS

Preferred embodiments of the present invention will be described in detail by reference to the following figures, wherein.

DESCRIPTION OF EMBODIMENTS

Figure 1:
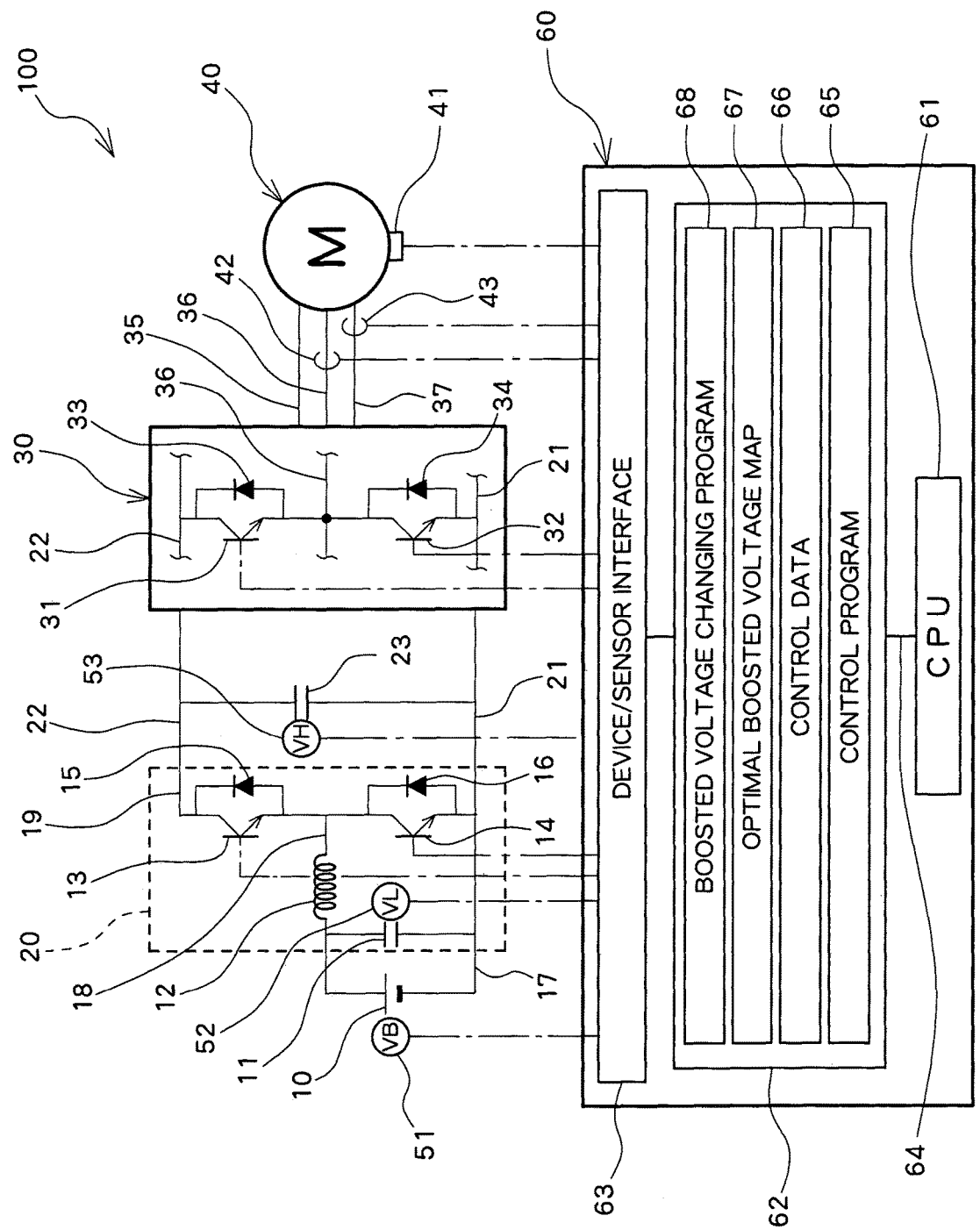
FIG. 1 is a system diagram illustrating a structure of a motor control system according to an embodiment of the present invention.

Preferred embodiments of the present invention will be described in detail with reference to the accompanying drawings. As illustrated in FIG. 1, the motor control system according to the present embodiment includes a battery 10, which is a chargeable secondary battery, a boost converter 20 connected to the battery 10, an inverter 30 connected to the boost converter 20, an alternating current motor 40 connected to the inverter 30, and a control unit 60 for controlling the boost converter 20 and the inverter 30.

A battery voltage sensor 51 that detects battery voltage VB is mounted to the battery 10, and a resolver 41 that detects the number of revolutions and the rotation angle is mounted to the alternating current motor 40.

As illustrated in FIG. 1, the boost converter 20 includes a negative side electric path 17 connected to a negative side of the battery 10, a low voltage electric path 18 connected to a positive side of the battery 10, and a high voltage electric path 19 at a positive side output terminal of the boost converter 20. The boost converter 20 includes an upper arm switching element (first switching element) 13 disposed between the low voltage electric path 18 and the high voltage electric path 19, a lower arm switching element (first switching element) 14 disposed between the negative side electric path 17 and the low voltage electric path 18, a reactor 12 disposed in series with the low voltage electric path 18, a filter capacitor 11 disposed between the low voltage electric path 18 and the negative side electric path 17, and a low voltage sensor 52 that detects direct-current low voltage VL across the filter capacitor 11. Each of the switching elements 13 and 14 includes a diode 15, 16 connected antiparallel thereto. The boost converter 20, after turning the lower arm switching element 14 on and turning the upper arm switching element 13 off at a predetermined carrier frequency Fc to store the electric energy from the battery 10 in the reactor 12, turns the lower arm switching element 14 off and turns the upper arm switching element 13 on, to boost the voltage by the electric energy stored in the reactor 12 and supplies direct-current high voltage VH, which is boosted voltage, to the high voltage electric path 19. The on/off time ratio of the upper arm switching element 13 and the on/off time ratio of the lower arm switching element 14 are determined according to a ratio between the direct-current low voltage VL and the direct-current high voltage VH.

The inverter 30 includes a common high voltage electric path 22 connected to the high voltage electric path 19 of the boost converter 20, and a common negative side electric path 21 connected to the negative side electric path 17 of the boost converter 20. A smoothing capacitor 23 is connected between the high voltage electric path 22 and the negative side electric path 21 in order to smooth the direct current supplied from the boost converter 20. The direct-current high voltage VH, which is boosted voltage supplied to the inverter 30 is detected by a high voltage sensor 53 that detects the voltage at both ends of the smoothing capacitor 23. Accordingly, the direct-current high voltage VH detected by the high voltage sensor 53 is actual boosted voltage (actual boosted voltage VHr). The inverter 30 converts the direct-current electric power supplied from the boost converter 20 to three-phase alternating-current electric power, which is then supplied to the alternating current motor 40.

The inverter 30 includes therein a total of six switching elements, including an upper arm switching element 31 and a lower arm switching element 32, which are second switching elements, for each of U, V, and W phases. A diode 33, 34 is connected antiparallel with each switching element 31, 32. (Note that FIG. 1 illustrates only upper and lower switching elements 31 and 32 for one phase and associated diodes 33 and 34, and does not illustrate switching elements and didoes for other phases). In the inverter 30, between the upper arm switching element and the lower arm switching element for each of U, V, and W phases, an output line 35, 36, 37 for outputting electric current of each of U, V, and W phases is mounted, and each output line 35, 36, 37 is connected to an input terminal for each of U, V, and W phases of the alternating current motor 40.

According to the present embodiment, current sensors 42 and 43 are provided to the output lines 36 and 37 for V phase and W phase, respectively, for detecting the respective electric currents. While the current sensor is not provided to the output line 35 of U phase, the electric current value of U phase can be obtained by calculation of the electric current values of V phase and W phase, because a sum of the electric currents of U, V, and W phases is zero in three-phase alternating current.

As illustrated in FIG. 1, the control unit 60 is a computer including a CPU 61 that performs operation processing, a storage unit 62, and a device/sensor interface 63, and the CPU 61 that performs operation processing is connected to the storage unit 62 and the device/sensor interface 63 via a data bus 64. The storage unit 62 stores therein a control program 65 and control data 66 for the alternating current motor, and an optimal boosted voltage map 67 and a boosted voltage changing program 68 which will be described below. Each of the switching elements 13 and 14 of the boost converter 20 and the switching elements 31 and 32 of the inverter 30, which have been described above, is connected to the control unit 60 through the device/sensor interface 63 and is configured to operate under command from the control unit 60. Further, each sensor output from the battery voltage sensor 51, the low voltage sensor 52, the high voltage sensor 53, and the resolver 41 is input to the control unit 60 through the device/sensor interface 63.

Figure 2A:
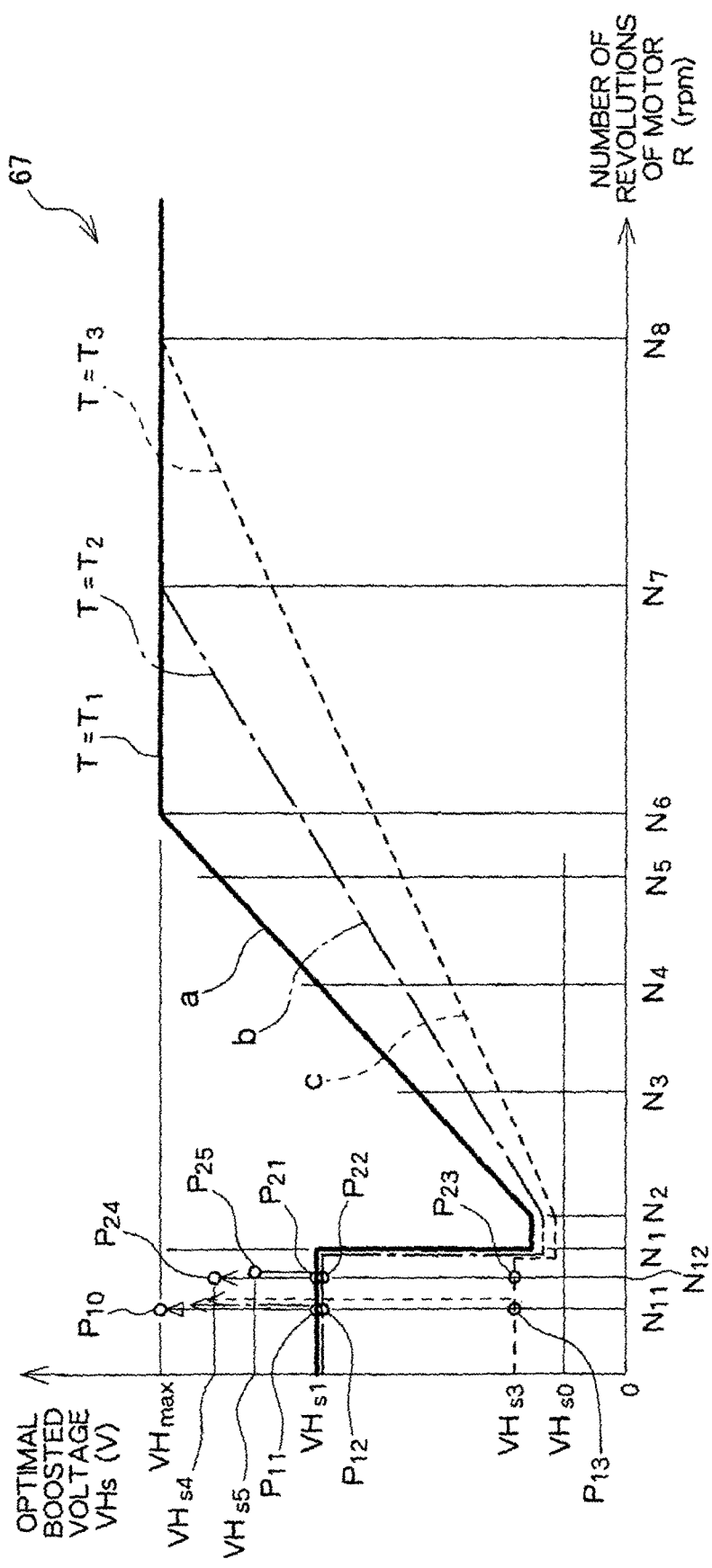
FIG. 2A is a map of the optimal boosted voltage with respect to the number of revolutions stored in a control unit of the motor control system according to the embodiment of the present invention.

By reference to FIG. 2A, the optimal boosted voltage map 67 stored in the storage unit 62 will be described. The optimal boosted voltage map 67 illustrated in FIG. 2A shows, in a map, the optimal values of the direct-current high voltage VH (optimal boosted voltage VHs) supplied to the inverter 30 by the boost converter 20 for operating the alternating current motor 40 with a requested number of revolutions and requested torque. In FIG. 2A, a solid line (a) shows the optimal boosted voltage VHs in a case where the alternating current motor 40 has large torque T ($T=T_1$); a dashed and single-dotted line (b) shows the optimal boosted voltage VHs in a case where the alternating current motor 40 has intermediate torque T ($T=T_2<T_1$); and a dashed line (c) shows the optimal boosted voltage VHs in a case where the alternating current motor 40 has small torque T ($T=T_3<T_2<T_1$).

As shown by the solid line (a) in FIG. 2A, in a case where the torque T of the alternating current motor 40 is $T_1$ (when the torque T is large), when the number of revolutions R of the alternating current motor 40 is between 0 and $N_1$, the optimal boosted voltage VHs is $VHs_1$, which is about 75% of the system maximum voltage VHmax. Here, the system maximum voltage VHmax is the maximum voltage that can be continuously applied to each of the alternating current motor 40, the boost converter 20, and the inverter 30. When the number of revolutions R of the alternating current motor 40 exceeds $N_1$, the optimal boosted voltage VHs drops from $VHs_1$ to a voltage which is slightly higher than the system minimum voltage $VHs_0$ (e.g, battery voltage VB) that is the minimum voltage which can be continuously applied to each of the alternating current motor 40, the boost converter 20, and the inverter 30. When the number of revolutions R of the alternating current motor 40 exceeds $N_2$ and continues to increase, the optimal boosted voltage VHs increases with the increase of the number of revolutions R, and reaches the system maximum voltage VHmax when the number of revolutions R of the alternating current motor 40 is $N_6$, and remains at the system maximum voltage VHmax when number of revolutions R of the alternating current motor 40 is $N_6$ or greater.

Further, as shown by the dashed and single-dotted line (b) in FIG. 2A, in the case where the torque T of the alternating current motor 40 is $T_2$ (when the torque T is intermediate), as with the case of the large torque T described above, the optimal boosted voltage VHs is $VHs_1$, when the number of revolutions R of the alternating current motor 40 is 0 to $N_1$. When the number of revolutions R of the alternating current motor 40 exceeds $N_1$, the optimal boosted voltage VHs decreases from $VHs_1$ to a voltage which is slightly higher than the system minimum voltage $VHs_0$, and when the number of revolutions R of the alternating current motor 40 increases after exceeding $N_2$, the optimal boosted voltage VHs also increases. The optimal boosted voltage VHs then reaches the system maximum VHmax when the number of revolutions R of the alternating current motor 40 R is $N_7$, which is higher than $N_6$, and remains at VHmax when the number of revolutions R of the alternating current motor 40 is $N_7$ or greater.

In the case where the torque T of the alternating current motor 40 is $T_1$ (when the torque T is small) as shown by the dashed line (c) in FIG. 2A, when the number of revolutions R of the alternating current motor 40 is 0 to $N_1$, the optimal boosted voltage VHs is $VHs_3$ which is about 30% of the system maximum voltage VHmax ($VHs_3<VHs_1$). When the number of revolutions R of the alternating current motor 40 exceeds $N_1$, the optimal boosted voltage VHs lowers from $VHs_3$ to a voltage slightly higher than the system minimum voltage $VHs_0$, and when the number of revolutions R of the alternating current motor 40 increases after exceeding $N_2$, the optimal boosted voltage VHs increases as the number of revolutions R increases and reaches the system maximum voltage VHmax when the number of revolutions R of the alternating current motor 40 is $N_8$, which is higher than $N_6$ and $N_7$. The optimal boosted voltage VHs remains the at system maximum voltage VHmax when the number of revolutions R of the alternating current motor 40 is $N_8$ or greater.

As described above, when the number of revolutions of the alternating current motor 40 is lower than $N_1$, the optimal boosted voltage VHs is as follows: when the torque T of the alternating current motor 40 is large or intermediate, the optimal boosted voltage VHs is $VHs_1$, which is about 75% of the system maximum voltage VHmax, and when the torque T of the alternating current motor 40 is small, the optimal boosted voltage VHs is $VHs_3$, which is about 30% of the system maximum voltage VHmax. When the number of revolutions of the alternating current motor 40 is between $N_1$ and $N_2$, the optimal boosted voltage VHs is slightly higher than the system minimum voltage $VHs_0$. When the number of revolutions of the alternating current motor 40 exceeds $N_2$, the optimal boosted voltage VHs increases with an increasing ratio in accordance with the torque T as the number of revolutions R increases. Then, the optimal boosted voltage VHs reaches the system maximum voltage VHmax with the number of revolutions R of $N_6$ or greater when the torque T of the alternating current motor 40 is large; the optimal boosted voltage VHs reaches the system maximum voltage VHmax with the number of revolutions R of $N_7$, which is greater than $N_6$, or greater, when the torque T is intermediate; and the optimal boosted voltage VHs reaches the system maximum voltage VHmax with the number of revolutions R of $N_8$, which is greater than $N_6$ and $N_7$, or greater when the torque T is small.

Figure 2B:
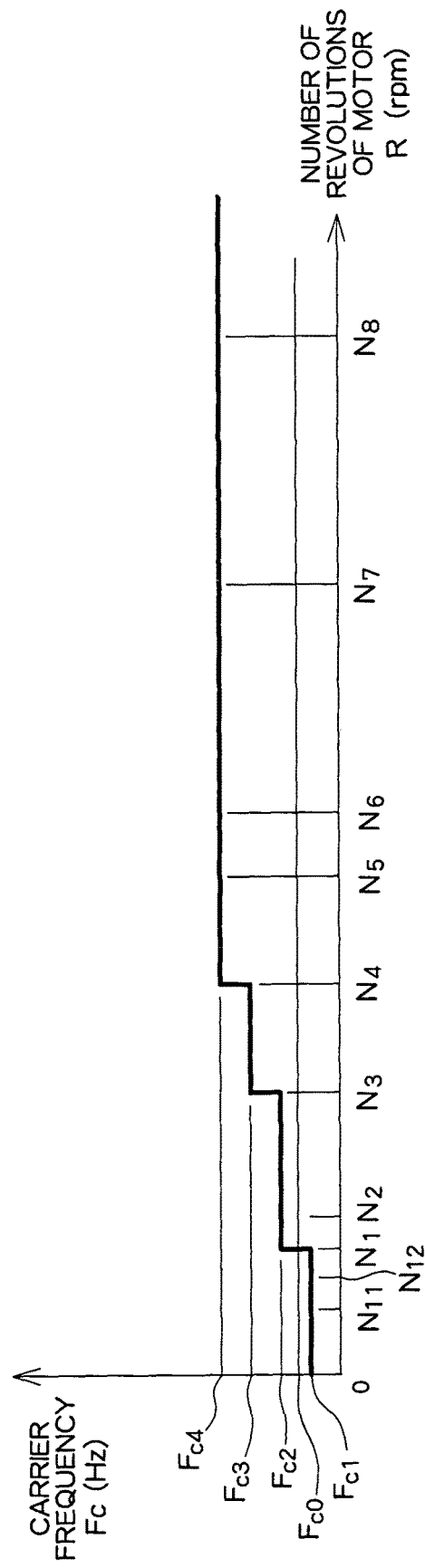
FIG. 2B is a map of the carrier frequency with respect to the number of revolutions stored in the control unit of the motor control system according to the embodiment of the present invention.

The control unit 60 stores, in the control data 66 in the storage unit 62, a carrier frequency map that defines the carrier frequency Fc with respect to the number of revolutions R of the alternating current motor 40, as shown in FIG. 2B. As shown in FIG. 2B, the carrier frequency Fc is defined such that it increases in four steps as the number of revolutions R increases: the carrier frequency Fc is the lowest, at $Fc_1$, when the number of revolutions R of the alternating current motor 40 is between 0 and $N_1$; the carrier frequency Fc is rather high, at $Fc_2$, when the number of revolutions R is between $N_1$ and $N_3$; the carrier frequency Fc is a further little higher, at $Fc_3$, when the number of revolutions R is between $N_3$ and $N_4$; and the carrier frequency Fc is the highest, at $Fc_4$, when the number of revolutions R is $N_4$ or greater Accordingly, as shown in FIG. 2A, with the number of revolutions R of the alternating current motor 40 of $N_{11}$ and $N_{12}$, between 0 and $N_1$, when the torque T of the alternating current motor 40 is intermediate or greater, the boost converter 20 operates at operating points $P_{11}$, $P_{12}$, $P_{21}$, and $P_{22}$ such that the boosted voltage (direct-current high voltage VH) is $VHs_1$ when the carrier frequency Fc is the lowest, at $Fc_1$, and when the torque T of the alternating current motor 40 is small, the boost converter 20 operates at operating points $P_{13}$ and $P_{23}$ such that the boosted voltage (direct-current high voltage VH) is $VHs_3$ which is about 30% of the system maximum voltage VHmax, when the carrier frequency Fc is the lowest, at $Fc_1$.

When the carrier frequency Fe is equal to or less than the predetermined threshold, the boosted voltage changing program 68 (boosted voltage changing means) of the motor control system 100 according to the present embodiment adjusts the boosted voltage (direct-current high voltage VH) of the boost converter 20 to a voltage which is higher than the optimal boosted voltage VHs defined by the optimal boosted voltage map 67.

Specifically, as shown in FIG. 2B, upon execution of the boosted voltage changing program 68, when the number of revolutions R of the alternating current motor 40 is $N_{11}$, and the carrier frequency Fc is $Fc_1$, which is lower than the predetermined threshold value $Fc_0$, the control unit 60 sets the boosted voltage (direct-current high voltage VH) of the boost converter 20 to the system maximum voltage VHmax, which is greater than the optimal boosted voltage VHs. Consequently, as shown in FIG. 2A, the operating points of the boost converter 20 are shifted from the operating points $P_{11}$, $P_{12}$, and $P_{13}$ obtained before execution of the boosted voltage changing program 68 to $P_{10}$, so that the boost converter 20 supplies the boosted voltage, which is the system maximum voltage VHmax, to the inverter 30.

The electric energy Pc stored in the smoothing capacitor 23 having direct-current high voltage VH (boosted voltage) applied to the respective ends is represented by the following Formula 1, wherein C is a capacitance of the smoothing capacitor 23:

$$Pc = (1/2) \times C \times VH^2 \quad \text{(Formula 1)}$$

Here, the energy $\Delta Pc_1$ required for a change of the direct-current high voltage VH by an amount of $\Delta VH$ when the direct-current high voltage VH is $VHs_1$ and the energy $\Delta Pcmax$ required for a change of the direct-current high voltage VH by an amount of $\Delta VH$ when the direct-current high voltage VH is VHmax are represented by the following formulas (Formula 2) and (Formula 3), respectively:

$$\Delta Pc_1 = (1/2) \times C \times [(VHs_1 + \Delta VH)^2 - VHs_1^2] \quad \text{(Formula 2)}$$
$$= (1/2) \times C \times [\Delta VH^2 + (2 \times VHs_1 \times \Delta VH)]$$

$$\Delta Pcmax = (1/2) \times C \times [(VHmax + \Delta VH)^2 - VHmax^2] \quad \text{(Formula 3)}$$
$$= (1/2) \times C \times [\Delta VH^2 + (2 \times VHmax \times \Delta VH)]$$

The difference between $\Delta Pcmax$ and $\Delta Pc_1$ is as follows:

$$\Delta Pcmax - \Delta Pc_1 = (1/2) \times C \times 2 \times \Delta VH \times (VHmax - VHs_1) \quad \text{(Formula 4)}$$
$$= C \times \Delta VH \times (VHmax - VHs_1)$$

As described above, as $VHs_1$ is about 75% of VHmax, and VHmax is larger than $VHs_1$ (VHmax>$VHs_1$), ($\Delta Pcmax - \Delta Pc_1$) in Formula 4 is positive, and $\Delta Pcmax$ is larger than $\Delta Pc_1$. Accordingly, a greater energy is required for changing the direct-current high voltage VH by an amount $\Delta VH$ when the direct-current high voltage VH is high than when the direct-current high voltage VH is low. In other words, when the direct-current high voltage VH is high, it is necessary to input greater energy than when the direct-current high voltage VH low in order to change the voltage by an amount of $\Delta VH$. When the energy of the same level is input, a fluctuation width of the voltage is smaller when the direct-current high voltage VH is high than when the direct-current high voltage VH is low.

Accordingly, when the operating points of the boost converter 20 are shifted from the operating points $P_{11}$, $P_{12}$, and $P_{13}$ obtained before execution of the boosted voltage changing program 68 to the operating point $P_{10}$ obtained at the time of execution of the boosted voltage changing program 68, and the direct-current high voltage increases from $VHs_1$ or $VHs_3$ to VHmax as shown in FIG. 2A, the voltage fluctuation of the direct-current high voltage VH becomes smaller.

As described above, by using the boosted voltage changing program 68 to increase the boosted voltage to the system maximum voltage VHmax, even when the inverter 30 is driven with the carrier frequency Fc, which is lower than the predetermined threshold value $Fc_0$, so that the alternating current motor 40 is driven with alternating current containing a large amount of fluctuation components and therefore the torque fluctuations of the alternating current motor 40 and the fluctuations of the counterelectromotive force of the alternating current motor 40 are large, it is possible to suppress the voltage fluctuations of the direct-current high voltage VH supplied from the boost converter 20 to the inverter 30, thereby preventing deterioration of controllability of the boost converter 20. The suppression of fluctuations of VH can also prevent deterioration of control responsiveness of the alternating current motor 40.

While in the above example, the optimal boosted voltage map shows in a map the optimal value of the direct-current high voltage VH (optimal boosted voltage VHs) which is supplied from the boost converter 20 to the inverter 30 for operating the alternating current motor 40 with the required number of revolutions and the required torque, as shown in FIG. 2A, the optimal boosted voltage map is not limited to this example and may be maps of various forms. Another example optimal boosted voltage map is a required lower limit voltage map which defines the lower limit voltage for operating the alternating current motor 40 with the required number of revolutions and the required torque and shows the voltage which allows operation of the alternating current motor 40 with the required number of revolutions and the required torque, while minimizing (optimizing) the boost loss of the boost converter 20. In this case, according to the boosted voltage changing program 68, when the carrier frequency Fc is lower than the predetermined threshold value $Fc_0$, the boosted voltage may be increased to the lower limit voltage defined in the required lower limit voltage map or greater; e.g., to the system maximum voltage VHmax.

Another operation of the motor control system 100 according to the present embodiment will be described. In the above description concerning the operation with reference to FIG. 2A, when the torque of the alternating current motor 40 is between $T_2$ and $T_1$ and the number of revolutions R of the alternating current motor 40 is between 0 and $N_1$, the optimal boosted voltage VHs is set to $VHs_1$ according to the optimal boosted voltage map 67. Further, when the carrier frequency Fc is lower than the predetermined threshold value $Fc_0$, the boosted voltage (direct-current high voltage VH) is increased to the system maximum voltage VHmax according to the boosted voltage changing program 68. However, the boosted voltage (direct-current high voltage VH) may be increased to a voltage lower than the system maximum voltage VHmax, so long as the voltage fluctuations of the direct-current high voltage VH can be suppressed.

For example, as the torque T of the alternating current motor 40 is larger, a larger amount of electric current flows in the alternating current motor 40. Therefore, when the torque fluctuations occur in the alternating current motor 40, a counterelectromotive force with larger fluctuations is generated and large fluctuation energy is input to the smoothing capacitor 23. When the torque T is small, as a small amount of electric current flows in the alternating current motor 40, the counterelectromotive force generated at the time of the torque fluctuations is not very large. Accordingly, when the torque T of the alternating current motor 40 is small, even if the boosted voltage (direct-current high voltage VH) is set to a voltage lower than VHmax, it is possible to suppress the voltage fluctuations of the boosted voltage (direct-current high voltage VH).

Figure 3:
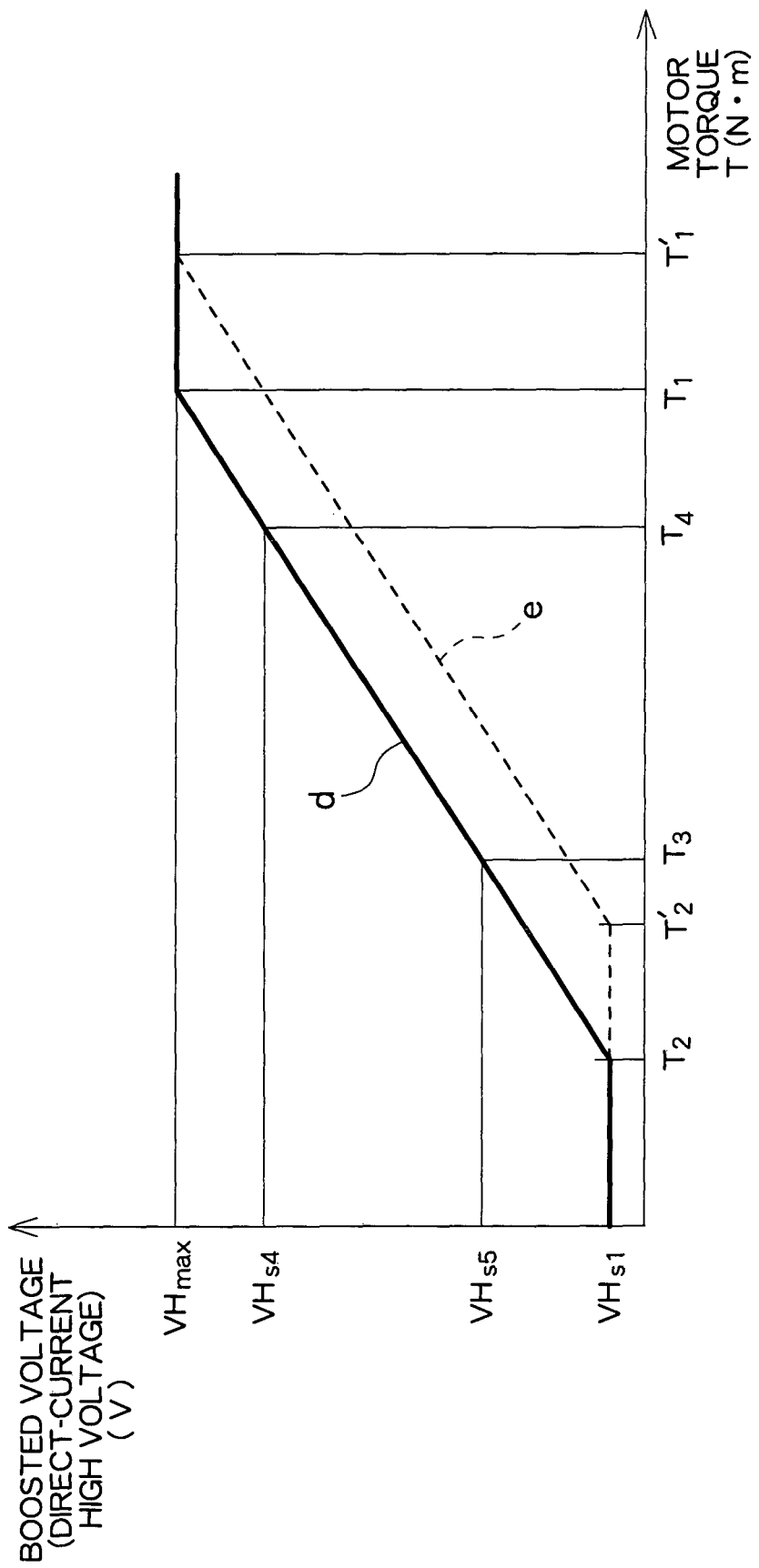
FIG. 3 is a graph showing the boosted voltage (direct-current high voltage VH) with respect to the motor torque of the motor control system according to the embodiment of the present invention.

The boosted voltage changing program 68 stores therein a map of the boosted voltage (direct-current high voltage VH) with respect to the torque T of the alternating current motor 40 as shown in FIG. 3. As shown by the solid line (d) in FIG. 3, when the torque T of the alternating current motor 40 is $T_2$, which is intermediate, the boosted voltage (direct-current high voltage VH) is $VHs_1$, similar to the case of the optimal boosted voltage map shown in FIG. 2A, and when the torque T is between $T_2$ and $T_1 (T_2 < T_1)$, the boosted voltage (direct-current high voltage VH) increases as the torque T increases and reaches the system maximum voltage VHmax when the torque T exceeds $T_1$.

When the map shown in FIG. 3 is used, when the number of revolutions R of the alternating current motor 40 is $N_{12}$ and the carrier frequency Fc is $Fc_1$ which is lower than the predetermined threshold value $Fc_0$ as shown in FIG. 2B, and when the torque of the alternating current motor 40 is $T_3$ which is between $T_2$ and $T_1$, the control unit 60 sets the boosted voltage (direct-current high voltage VH) to $VHs_5$ which is higher than $VHs_1$ and lower than VHmax. With this setting, the operating point of the boost converter 20 is shifted from the operating point $P_{21}$ obtained prior to execution of the boosted voltage changing program 68 to the operating point $P_{25}$ obtained by execution of the boosted voltage changing program 68, and the boost converter 20 supplies the boosted voltage (direct-current high voltage VH) of $VHs_5$ to the inverter 30. When the torque of the alternating current motor 40 is $T_4$, which is between $T_2$ and $T_1$ and larger than $T_3$, the control unit 60 sets the boosted voltage (direct-current high voltage VH) to $VHs_4$, which is higher than $VHs_1$ and $VHs_5$ and lower than VHmax. With this setting, the operating point of the boost converter 20 is shifted from the operating point $P_{22}$ obtained prior to execution of the boosted voltage changing program 68 to the operating point $P_{24}$ obtained by execution of the boosted voltage changing program 68, and the boost converter 20 supplies the boosted voltage (direct-current high voltage VH) of $VHs_4$ to the inverter 30. Similarly, when the torque T of the alternating current motor 40 is $T_2$, which is intermediate, the boost converter 20 supplies the boosted voltage (direct-current high voltage VH) of $VHs_1$ to the inverter 30, and when the torque T of the alternating current motor 40 exceeds $T_1$, the boost converter 20 supplies the boosted voltage (direct-current high voltage VH) of VHmax to the inverter 30.

With this operation, similar to the operation of the above described example, it is possible to suppress the fluctuations of the boosted voltage (direct-current high voltage VH) generated when the inverter 30 is driven with the low carrier frequency Fc and the alternating current motor 40 is driven with the low number of revolutions and large torque. Also, as the boosted voltage (direct-current high voltage VH) is not increased to VHmax but is increased only to a voltage lower than VHmax in accordance with the torque T of the alternating current motor 40, it is possible to suppress the fluctuations of the boosted voltage (direct-current high voltage VH) while suppressing the increase in the loss of the boost converter 20.

The map shown in FIG. 3 can include a plurality of lines. When the capacitance of the smoothing capacitor 23 is large, for example, as the fluctuations of the boosted voltage (direct-current high voltage VH) are small, the boosted voltage (direct-current high voltage VH) is maintained at $VHs_1$ until the torque T of the alternating current motor 40 reaches $T_2'$, which is larger than $T_2$, and the boosted voltage (direct-current high voltage VH) is increased as the torque T increases with the torque T being between $T_2'$ and $T_1'$, which is larger than $T_1$, and then reaches the system maximum voltage VHmax with the torque T exceeding $T_1'$, which is larger than $T_1$, as shown by the dashed line (e) in FIG. 3, so that the boosted voltage (direct-current high voltage VH) may be increased to a voltage which is lower than that in the case of the solid line (d) under the condition that the torque T is the same.

In the case of executing the boosted voltage changing program 68 with the use of the relationship indicated by the dashed line (e) in FIG. 3, the boosted voltage (direct-current high voltage VH) is lower than when executing the boosted voltage changing program 68 with the use of the relationship indicated by the solid line (d) in FIG. 3, when the torque T is the same. It is therefore possible to suppress the fluctuations of the boosted voltage (direct-current high voltage VH) more efficiently while suppressing the increase in the loss of the boost converter 20, as compared to the case of using the relationship shown by the solid line (d).

The present invention is not limited to each embodiment described above and may include all changes and corrections which do not depart from the technical scope or gist of the present invention defined by the appended claims.

REFERENCE SIGNS LIST 10 battery, 11 filter capacitor, 12 reactor, 13, 31 upper arm switching element, 14, 32 lower arm switching element, 15, 16, 33, 34 diode, 17, 21 negative side electric path, 18 low voltage electric path, 19, 22 high voltage electric path, 20 boost converter, 23 smoothing capacitor, 30 inverter, 35, 36, 37 output line, 40 alternating current motor, 41 resolver, 42, 43 current sensor, 51 battery voltage sensor, 52 low voltage sensor, 53 high voltage sensor, 60 control unit, 61 CPU, 62 storage unit, 63 device/sensor interface, 64 data bus, 65 control program, 66 control data, 67 optimal boosted voltage map, 68 boosted voltage changing program, 100 motor control system.

The invention claimed is:
1. A motor control system comprising:
a boost converter configured to turn a plurality of first switching elements on/off at a predetermined carrier frequency to boost voltage of a battery and obtain boosted direct-current electric power;

an inverter configured to turn a plurality of second switching elements on/off at a predetermined carrier frequency to convert the boosted direct-current electric power output from the boost converter to alternating-current electric power, the inverter supplying the alternating-current electric power to a motor; and a control unit configured to adjust boosted voltage of the boost converter, wherein the control unit includes an optimal boosted voltage map that defines optimal boosted voltage for operating the motor with a required number of revolutions and required torque, wherein the optimal boosted voltage is a first voltage that is lower than a system maximum voltage when the number of revolutions of the motor is between 0 and a first number of revolutions; the optimal boosted voltage is a second voltage that is lower than the first voltage when the number of revolutions of the motor exceeds the first number of revolutions but is equal to or smaller than a second number of revolutions; and the optimal boosted voltage increases to a voltage between the second voltage and the system maximum voltage in accordance with the number of revolutions of the motor when the number of revolutions of the motor exceeds the second number of revolutions, and the control unit sets the boosted voltage of the boost converter to a voltage which is higher than the first voltage defined by the optimal boosted voltage map, when the number of revolutions of the motor is between 0 and the first number of revolutions and the carrier frequency of the inverter is equal to or lower than a predetermined threshold value.

2. The motor control system according to claim 1, wherein the control unit sets the boosted voltage of the boost converter to a system maximum voltage when the number of revolutions of the motor is between 0 and the first number of revolutions and the carrier frequency is equal to or lower than the predetermined threshold value.

3. The motor control system according to claim 1, wherein the control unit increases a deviation of the boosted voltage of the boost converter from the first voltage as the torque of the motor is larger, when the number of revolutions of the motor is between 0 and the first number of revolutions and the carrier frequency is equal to or lower than the predetermined threshold value.

4. A motor control system comprising:

a boost converter configured to turn a plurality of first switching elements on/off at a predetermined carrier frequency to boost voltage of a battery and obtain boosted direct-current electric power;

an inverter configured to turn a plurality of second switching elements on/off at a predetermined carrier frequency to convert the boosted direct-current electric power output from the boost converter to alternating-current electric power, the inverter supplying the alternating-current electric power to a motor; and a control unit including a CPU and configured to adjust boosted voltage of the boost converter, wherein the control unit includes an optimal boosted voltage map that defines optimal boosted voltage for operating the motor with a required number of revolutions and required torque, wherein the optimal boosted voltage is a first voltage that is lower than a system maximum voltage when the number of revolutions of the motor is between 0 and a first number of revolutions; the optimal boosted voltage is a second voltage that is lower than the first voltage when the number of revolutions of the motor exceeds the first number of revolutions but is equal to or smaller than a second number of revolutions; and the optimal boosted voltage increases to a voltage between the second voltage and the system maximum voltage in accordance with the number of revolutions of the motor when the number of revolutions of the motor exceeds the second number of revolutions, and the control unit causes the CPU to execute a boosted voltage changing program for setting the boosted voltage of the boost converter to a voltage which is higher than the first voltage defined by the optimal boosted voltage map, when the number of revolutions of the motor is between 0 and the first number of revolutions and the carrier frequency of the inverter is equal to or lower than a predetermined threshold value.

* * * * *